United States Patent
Hai et al.

(10) Patent No.: US 12,488,615 B2
(45) Date of Patent: Dec. 2, 2025

(54) DISPLAY PANEL AND DISPLAY APPARATUS

(71) Applicant: BOE Technology Group Co., Ltd., Beijing (CN)

(72) Inventors: Xiaoquan Hai, Beijing (CN); Xiaoliang Ding, Beijing (CN); Xuan Liang, Beijing (CN); Yingzi Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 388 days.

(21) Appl. No.: 17/921,081

(22) PCT Filed: Jun. 8, 2021

(86) PCT No.: PCT/CN2021/098799
§ 371 (c)(1),
(2) Date: Oct. 24, 2022

(87) PCT Pub. No.: WO2022/022068
PCT Pub. Date: Feb. 3, 2022

(65) Prior Publication Data
US 2023/0345794 A1    Oct. 26, 2023

(30) Foreign Application Priority Data

Jul. 29, 2020  (CN) .......................... 202010741594.7

(51) Int. Cl.
*G06V 40/13* (2022.01)
*H10K 39/34* (2023.01)
(Continued)

(52) U.S. Cl.
CPC ......... *G06V 40/1318* (2022.01); *H10K 39/34* (2023.02); *H10K 59/122* (2023.02);
(Continued)

(58) Field of Classification Search
CPC .. G06V 40/1318; H10K 39/34; H10K 59/122; H10K 59/60; H10K 59/8792;
(Continued)

(56) References Cited

U.S. PATENT DOCUMENTS

2018/0040675 A1    2/2018 Zeng et al.
2018/0129852 A1*   5/2018 Zeng .................. H10K 59/1275
(Continued)

FOREIGN PATENT DOCUMENTS

CN    106981503 A    7/2017
CN    107122742 A    9/2017
(Continued)

OTHER PUBLICATIONS

PCT/CN2021/098799 international search report.
CN202010741594.7—First Office Action mailed on Oct. 24, 2024, 19 pages.

*Primary Examiner* — S M Sohel Imtiaz
(74) *Attorney, Agent, or Firm* — IPro, PLLC

(57) ABSTRACT

A display panel includes a base substrate; light-emitting devices on the base substrate; photosensitive devices between a layer where the light-emitting devices are located and the base substrate, the photosensitive devices being configured to collect light emitted by the light emitting devices and reflected by a fingerprint, and orthographic projections of the photosensitive devices on the base substrate being located in gaps between orthographic projections of the light-emitting devices on the base substrate; and a light-shielding portion on a light-incident side of the photosensitive devices, an orthographic projection of the light-shielding portion on the base substrate overlapping with edge regions of the orthographic projections of the photosensitive devices, the light-shielding portion being provided with first openings, and the orthographic projec-
(Continued)

tions of the first openings on the base substrate overlapping with middle regions of the orthographic projections of the photosensitive devices.

20 Claims, 9 Drawing Sheets

(51) Int. Cl.
*H10K 59/122* (2023.01)
*H10K 59/60* (2023.01)
*H10K 59/80* (2023.01)
*H10K 102/00* (2023.01)

(52) U.S. Cl.
CPC ......... *H10K 59/60* (2023.02); *H10K 59/8792* (2023.02); *H10K 2102/3026* (2023.02)

(58) Field of Classification Search
CPC ......... H10K 2102/3026; H10K 59/126; H10K 65/00; H10K 59/35; H10K 59/40
See application file for complete search history.

(56) References Cited

U.S. PATENT DOCUMENTS

| | | | | |
|---|---|---|---|---|
| 2019/0065813 | A1* | 2/2019 | Xu | ............................ H10F 39/18 |
| 2019/0099096 | A1* | 4/2019 | Wang | ..................... H10K 39/34 |
| 2021/0064837 | A1* | 3/2021 | Zeng | ................... G06V 40/1318 |
| 2021/0223621 | A1 | 7/2021 | Huang et al. | |
| 2021/0334504 | A1* | 10/2021 | Lu | ......................... H10F 39/8053 |

FOREIGN PATENT DOCUMENTS

| | | |
|---|---|---|
| CN | 107422560 A | 12/2017 |
| CN | 109638047 A | 4/2019 |
| CN | 109713003 A | 5/2019 |
| CN | 109728060 A | 5/2019 |
| CN | 110890411 A | 3/2020 |
| CN | 111308767 A | 6/2020 |

* cited by examiner

1021/104    103

DISPLAY PANEL AND DISPLAY APPARATUS

CROSS-REFERENCE OF RELATED APPLICATIONS

The present application is a national phase entry under 35 U.S.C. § 371 of International Application No. PCT/CN2021/098799, filed on Jun. 8, 2021, which claims the priority of Chinese Patent Application No. 202010741594.7, filed with the China National Intellectual Property Administration on Jul. 29, 2020 and entitled "Display Panel and Display Apparatus", the entire contents of which are hereby incorporated by reference.

FIELD

The disclosure relates to the field of display technology, and in particular, to a display panel and a display apparatus.

BACKGROUND

With the continuous development of terminal technologies, electronic devices are used more and more widely. Due to the uniqueness of skin texture such as fingerprint pattern or palmprint pattern, in order to protect user's information security, the use of the fingerprint identification function on electronic devices is becoming more and more common, for example, for mobile phone unlocking, mobile payment (such as payment, transfer), etc.

BRIEF SUMMARY

In one aspect, embodiments of the disclosure provide a display panel, including:
a base substrate;
a plurality of light emitting devices located on the base substrate;
a plurality of photosensitive devices located between a layer where the plurality of light emitting devices are located and the base substrate; wherein the plurality of photosensitive devices are configured to collect light emitted by the plurality of light emitting devices and reflected by a fingerprint; and orthographic projections of the photosensitive devices on the base substrate are located in gaps between orthographic projections of the light emitting devices on the base substrate;
a light shielding portion located on a light-incident side of the plurality of photosensitive devices, wherein an orthographic projection of the light shielding portion on the base substrate overlaps with edge regions of the orthographic projections of the photosensitive devices; and the light shielding portion has first openings, and orthographic projections of the first openings on the base substrate overlap with middle regions of the orthographic projections of the photosensitive devices.

Optionally, in the above-mentioned display panel provided by the embodiments of the disclosure, the light emitting device is a light emitting device of top emission type, including: an anode, a cathode located on a side of the anode away from the base substrate, and a light emitting function layer located between the anode and the cathode:
the photosensitive device includes: a metal electrode and a transparent electrode opposite to each other, and a photoelectric conversion layer located between the metal electrode and the transparent electrode, wherein the transparent electrode is located between a layer where the metal electrode is located and a layer where the anode is located;
the light shielding portion is located between a layer where the transparent electrode is located and the light emitting function layer.

Optionally, in the above-mentioned display panel provided by the embodiments of the disclosure, the anode is multiplexed as the light shielding portion.

Optionally, the above-mentioned display panel provided by the embodiments of the disclosure further includes: a pixel defining layer located between the layer where the anode is located and the layer where the transparent electrode is located and having a plurality of pixel openings:
wherein an orthographic projection of the anode on the base substrate completely covers orthographic projections of the pixel openings, and overlapping regions of the orthographic projection of the anode on the base substrate with the edge regions of the orthographic projections of the photosensitive devices are located within an orthographic projection of the pixel defining layer.

Optionally, the above-mentioned display panel provided by the embodiments of the disclosure further includes: a pixel defining layer located between the layer where the anode is located and the layer where the transparent electrode is located and having a plurality of pixel openings:
wherein an orthographic projection of the anode on the base substrate completely covers orthographic projections of the pixel openings, and partial overlapping regions of the orthographic projection of the anode on the base substrate with the edge regions of the orthographic projections of the photosensitive devices are located within the orthographic projections of the pixel openings.

Optionally, in the above-mentioned display panel provided by the embodiments of the disclosure, the light emitting device is a light emitting device of bottom emission type, including: an anode, a cathode located on a side of the anode facing the base substrate, and a light emitting function layer located between the anode and the cathode:
the photosensitive device includes: a metal electrode and a transparent electrode opposite to each other, and a photoelectric conversion layer located between the transparent electrode and the metal electrode, wherein the metal electrode is located between a layer where the transparent electrode is located and a layer where the cathode is located;
the light shielding portion is located between the layer where the transparent electrode is located and the base substrate.

Optionally, the above-mentioned display panel provided by the embodiments of the disclosure further includes: a plurality of top-gate-type transistors located between the base substrate and the layer where the transparent electrode is located, and a light shielding metal layer located between a layer where the plurality of top-gate-type transistors are located and the base substrate: wherein the light shielding metal layer is multiplexed as the light shielding portion.

Optionally, in the above-mentioned display panel provided by the embodiments of the disclosure, an orthographic projection of the light shielding metal layer on the base substrate coincides completely with an orthographic projection of active layers of the plurality of top-gate-type transistors and the edge regions of the orthographic projections of the photosensitive devices.

Optionally, in the above-mentioned display panel provided by the embodiments of the disclosure, the orthographic projection of the light shielding portion on the base substrate overlaps by a same width with the edge regions of the orthographic projections of the plurality of photosensitive devices.

Optionally, in the above-mentioned display panel provided by the embodiments of the disclosure, a width d of an edge region of the photosensitive device satisfies a following relation:

$$d=h*\tan\theta$$

wherein h is a distance between a layer where the light shielding portion is located and a layer where the plurality of photosensitive devices are located in a direction perpendicular to the base substrate, and θ is a maximum reflection angle of light reflected by the fingerprint to the plurality of photosensitive devices.

Optionally, in the above-mentioned display panel provided by the embodiments of the disclosure, a width D of the photosensitive device satisfies a following relation:

$$D \geq h*(\tan\theta+2\tan\theta c), \text{ or } D=L+h*\tan\theta$$

wherein h is a distance between a layer where the light shielding portion is located and a layer where the plurality of photosensitive devices are located in a direction perpendicular to the base substrate, θ is a maximum reflection angle of light reflected by the fingerprint to the plurality of photosensitive devices, θc is a minimum reflection angle of light reflected by the fingerprint to the plurality of photosensitive devices, and L is a width of the first opening.

Optionally, in the above-mentioned display panel provided by the embodiments of the disclosure, h is greater than or equal to 1 μm and less than or equal to 4 μm.

In another aspect, embodiments of the disclosure provide a display apparatus, including the above-mentioned display panel.

DETAILED DESCRIPTION OF THE EMBODIMENTS

Figure 1:
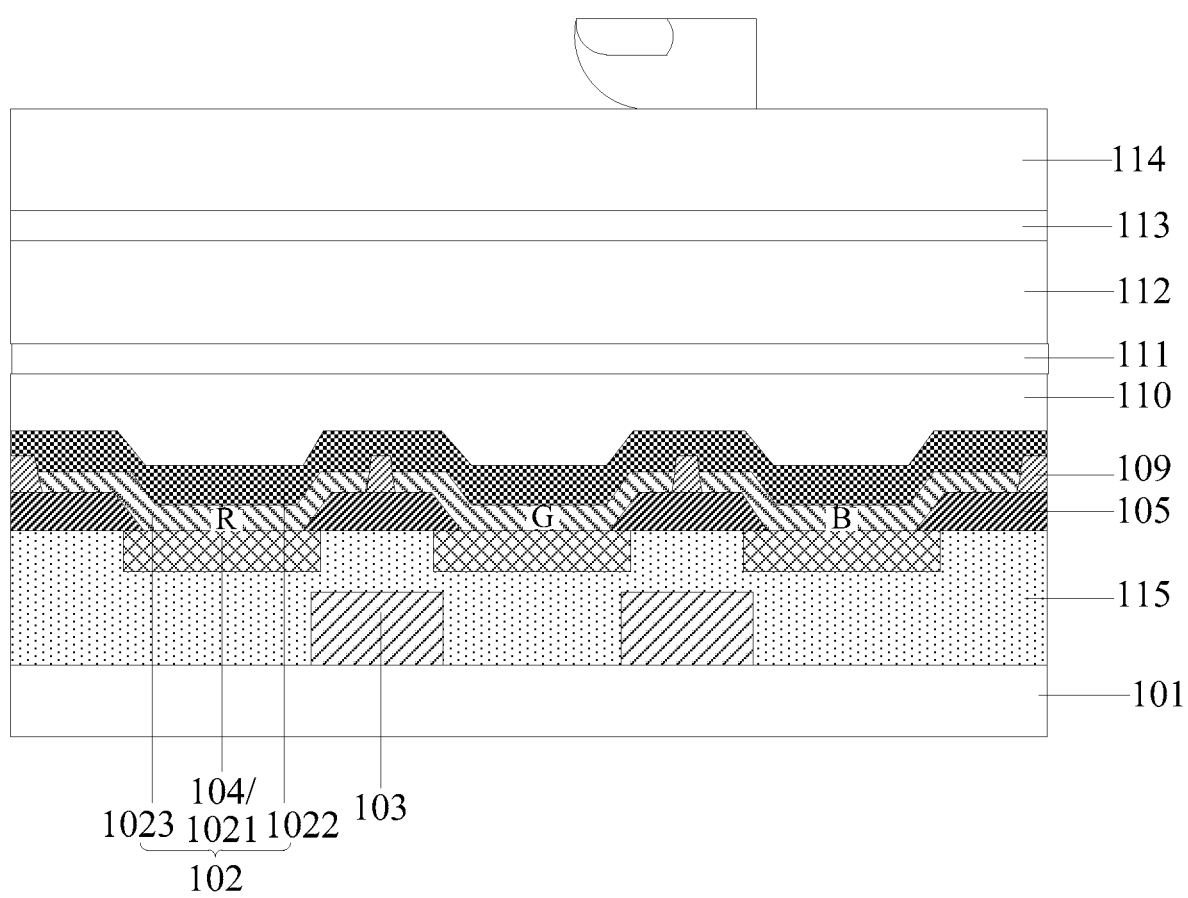
FIG. 1 is a structural schematic diagram of a display panel according to an embodiment of the disclosure.

In order to make the purposes, technical solutions and advantages of the disclosure clearer, the technical solutions of the embodiments of the disclosure will be described clearly and completely below in combination with the accompanying drawings of the embodiments of the disclosure. It is necessary to note that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way. Obviously the described embodiments are a part of the embodiments of the disclosure but not all the embodiments. Based upon the embodiments of the disclosure, all of other embodiments obtained by those ordinary skilled in the art without creative work pertain to the protection scope of the disclosure.

Unless otherwise defined, the technical or scientific terms used here shall have the general meaning understood by those ordinary skilled in the art to which the disclosure belongs. The "first", "second" and similar words used in the specification and claims of the disclosure do not represent any order, number or importance, and are only used to distinguish different components. The word such as "include" or "contain" or the like means that the element or object appearing before this word encompasses the elements or objects and their equivalents listed after this word, without excluding other elements or objects. The words such as "inner", "outer", "up", "down" are only used to represent the relative position relationship. When the absolute position of a described object changes, the relative position relationship may also change accordingly.

At present, the narrow border gradually becomes the mainstream in the design and manufacture of display apparatuses, especially for portable display apparatuses such as mobile phones. One of the means to achieve the narrow border is to integrate a photosensitive device with the fingerprint identification function into the display apparatus, realizing the fingerprint identification under the screen, increasing the area of the display region of the display apparatus, and then increasing the screen occupation ratio.

For example, a point light source, a line light source, or a light source with a certain pattern may be used as the photosensitive light source of the photosensitive device for fingerprint identification. Further, there are various ways to arrange the light source and the photosensitive device. For example, the light source may be arranged on the side of the photosensitive device close to the fingerprint touch, or the light source may be arranged in the same plane as the photosensitive device, or the light source may also be arranged on the side of the photosensitive device away from the fingerprint touch. The way to arrange the light source and the photosensitive device may be selected according to different demands.

The Organic Light Emitting Diode (OLED), as a kind of current-type light emitting device, has the advantages of self-luminescence, fast response, wide viewing angle and ability to be made into flexible products, and thus has been widely applied in the field of high-performance display. In the following, the OLED is used as a point light source of the photosensitive device, and the point light source is arranged on the side of the photosensitive device close to the fingerprint touch as an example, to introduce the principle of fingerprint identification, but this does not limit the embodiments of the disclosure.

In the process of fingerprint identification, when light emitted by the OLED point light source is irradiated on the fingerprint pressing interface (such as the outer surface of the display screen) at different angles, due to the total reflection of the fingerprint pressing interface, a part of the light with the incident angle (i.e., 42° to) 70° greater than or equal to the critical angle of total reflection (generally, the critical angle of total reflection between the display apparatus and the air is about 42°, and the maximum angle of emergence of the point light source is) 70° will be totally reflected, so that this part of the light cannot emit from the fingerprint pressing interface, thus generating a total reflection region. Correspondingly, a part of the light with the incident angle less than the critical angle of total reflection (42°) emits from the fingerprint pressing interface. Therefore, the texture image may be collected through the light reflected by the total reflection region. In other words, when the fingerprint of the user's finger is pressed to the total reflection region, the ridge of the fingerprint touches the surface of the total reflection region, so the total reflection condition of the position corresponding to the ridge of the fingerprint is destroyed, and thus the light will emit at this position, so that the original reflection path is changed. However, the valley of the fingerprint will not touch the surface of the total reflection region, so the total reflection condition of the position corresponding to the valley of the fingerprint is not destroyed, and thus the light will still be totally reflected at this position, so that the original reflection path is not changed. In this way, due to different effects of the valley and ridge of the fingerprint on the total reflection condition of the light in the total reflection region, the light incident on the fingerprint imaging interface forms an alternately dark and bright texture image at different positions.

However, in the process of fingerprint identification, in addition to the light emitted by the OLED point light source that can be sensed by the photosensitive device, the photosensitive device may also sense the ambient light incident through the finger or the like. The photosensitive device receives light passively and will not actively distinguish the light emitted by the OLED point light source from the ambient light, so the ambient light may interfere with the fingerprint identification of the photosensitive device, resulting in blurred or even impossible texture imaging.

Figure 2:
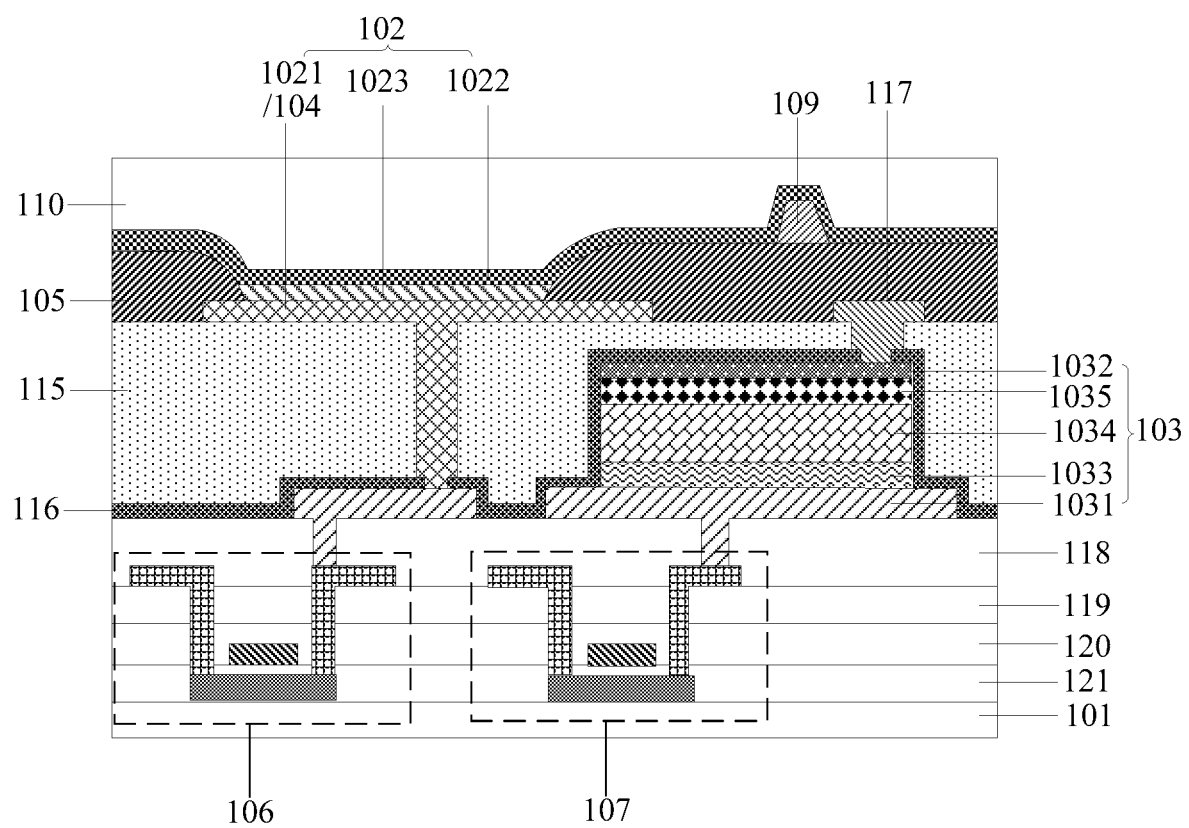
FIG. 2 is another structural schematic diagram of a display panel according to an embodiment of the disclosure.

For the above technical problems in the related technology, embodiments of the disclosure provide a display panel, as shown in FIG. 1 and FIG. 2, including:
a base substrate 101;
a plurality of light emitting devices 102 on the base substrate 101;
a plurality of photosensitive devices 103 between a layer where the plurality of light emitting devices 102 are located and the base substrate 101: wherein the plurality of photosensitive devices 103 are configured to collect light emitted by the plurality of light emitting devices 102 and reflected by a fingerprint; and orthographic projections of the photosensitive devices 103 on the base substrate 101 are in gaps between orthographic projections of the light emitting devices 102 on the base substrate 101;
a light shielding portion 104 on a light-incident side of the plurality of photosensitive devices 103, wherein an orthographic projection of the light shielding portion 104 on the base substrate 101 overlaps with edge regions of the orthographic projections of the photosensitive devices 103; and the light shielding portion 104 is provided with first openings, and orthographic projections of the first openings on the base substrate 101 overlap with middle regions of the orthographic projections of the photosensitive devices 103.

In the above-mentioned display panel provided by the embodiments of the disclosure, the light emitting devices 102 are used as the point light sources of the photosensitive devices 103. The light with the irritation angle of 42° to 70° belongs to the signal light in the fingerprint identification process. By setting the light shielding portion 104 that shields the edge regions of the photosensitive devices 103, the ambient light incident perpendicularly on the photosensitive surfaces of the photosensitive devices 103 is effectively shielded, so that most of the light received by the photosensitive devices 103 is signal light, to effectively avoids the influence of the ambient light on the signal light and improve the optical Signal-to-Noise Ratio (SNR).

Figure 3:
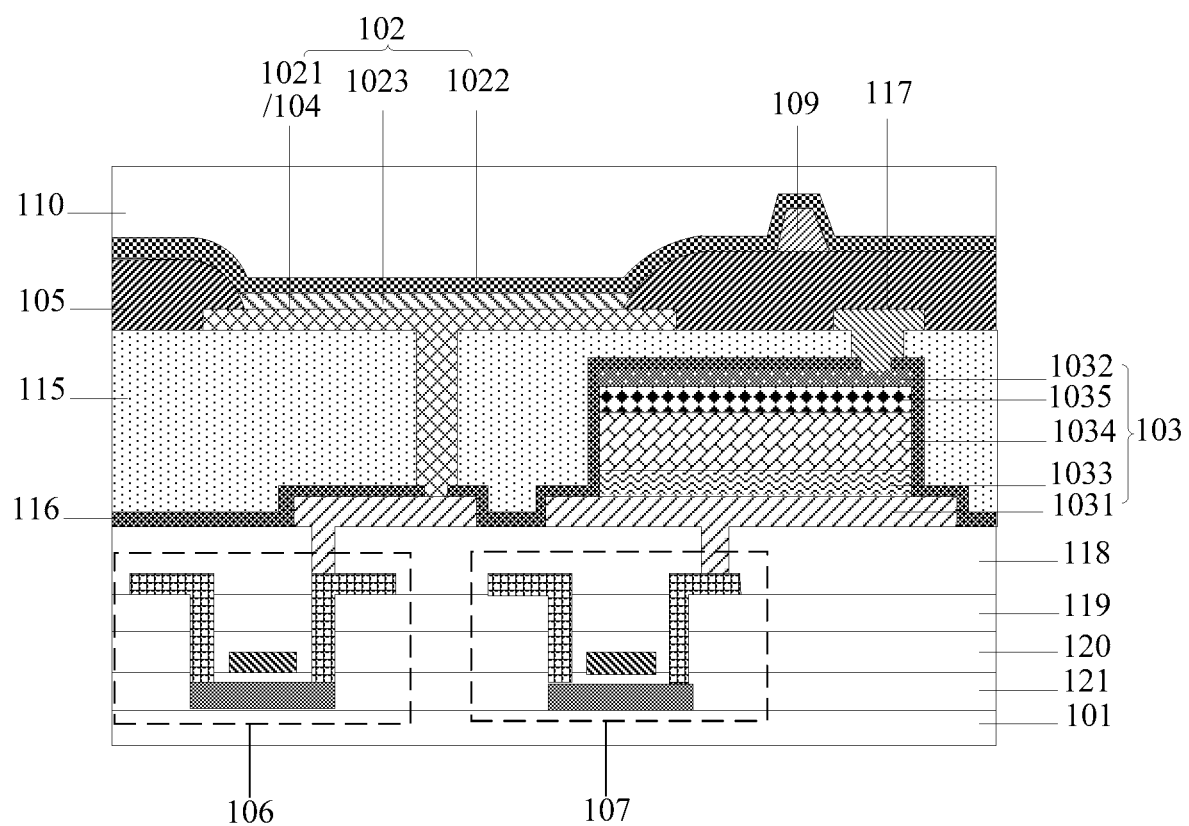
FIG. 3 is another structural schematic diagram of a display panel according to an embodiment of the disclosure.

Optionally, in the above-mentioned display panel provided by the embodiments of the disclosure, as shown in FIG. 2 and FIG. 3, the light emitting device 102 is a light emitting device of top emission type, including: an anode 1021, a cathode 1022 on a side of the anode 1021 away from the base substrate 101, and a light emitting function layer 1023 between the anode 1021 and the cathode 1022. For example, the emitting function layer 1023 may include a hole injection layer, a hole transport layer, an electron blocking layer, an organic electroluminescent layer or a quantum dot luminescent layer, a hole blocking layer, an electron transport layer and an electron injection layer.

The photosensitive device 103 includes: a metal electrode 1031 and a transparent electrode 1032 opposite to each other, and a photoelectric conversion layer between the metal electrode 1031 and the transparent electrode 1032. The transparent electrode 1032 is between a layer where the metal electrode 1031 is located and a layer where the anode 1021 is located. for example, the photoelectric conversion layer is composed of a P-type semiconductor layer 1033, an intrinsic semiconductor layer 1034 and an N-type semiconductor layer 1035 that are laminated.

The light shielding portion 104 is between a layer where the transparent electrode 1032 is located and the light emitting function layer 1023.

Since the photosensitive device 103, the light shielding portion 104 and the light emitting device 102 of top emission type are sequentially laminated on the base substrate 101, the light emitted from the light emitting device 102 of top emission type may be reflected by a finger and then incident to the photosensitive device 103 through the film layer where the light shielding portion 104 is located. Further, the light shielding portion 104 reduces the incidence of the ambient light to a certain extent, thus reducing the interference of the ambient light and improving the accuracy of fingerprint identification.

Optionally, in the above-mentioned display panel provided by the embodiments of the disclosure, the anode 1021 is multiplexed as the light shielding portion 104. Then, the gaps between anodes 1021 are the first openings of the light shielding portion 104.

The anode 1021 in the related art is multiplexed as the light shielding portion 104, avoiding the need to manufacture the light shielding portion 104 separately through a mask process, thereby simplifying the manufacturing process, saving the mask cost, and realizing the light and thin design. For example, the anode 1021 may be an electrode with low reflectivity of which the surface is ashed with ozone or the like.

Optionally, in the above-mentioned display panel provided by the embodiments of the disclosure, in the case where the anode 1021 is multiplexed as the light shielding portion 104, the occlusion effect of the light shielding portion 104 on the edge region of the photosensitive device 103 may be realized by three following possible implementations.

Figure 4:
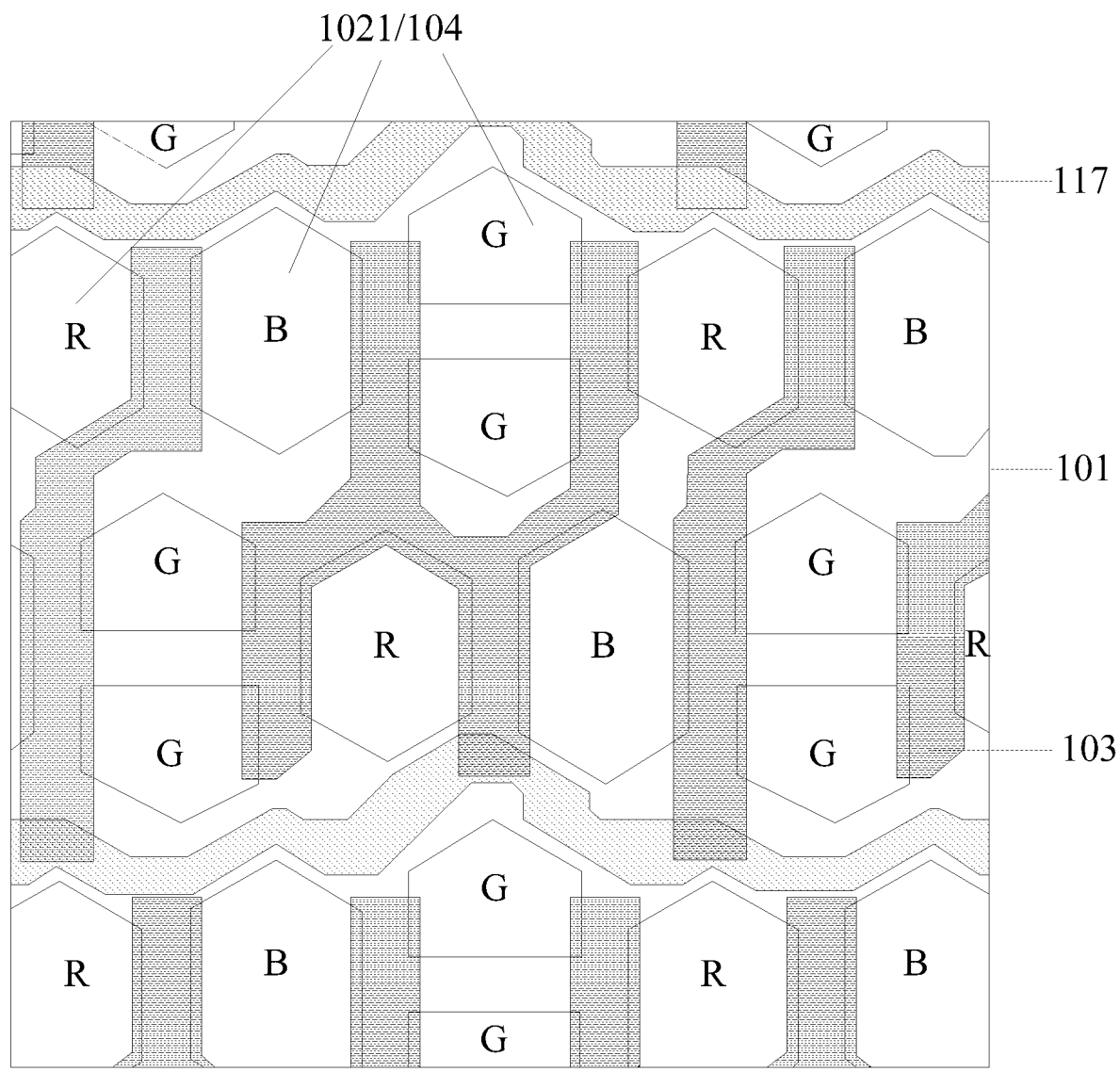
FIG. 4 is another structural schematic diagram of a display panel according to an embodiment of the disclosure.

In the first implementation, the size of the photosensitive device 103 is kept unchanged while the size of the anode 1021 is increased, to realize the overlapping of the anode 1021 with the edge of the photosensitive device 103, as shown in FIG. 4.

Figure 5:
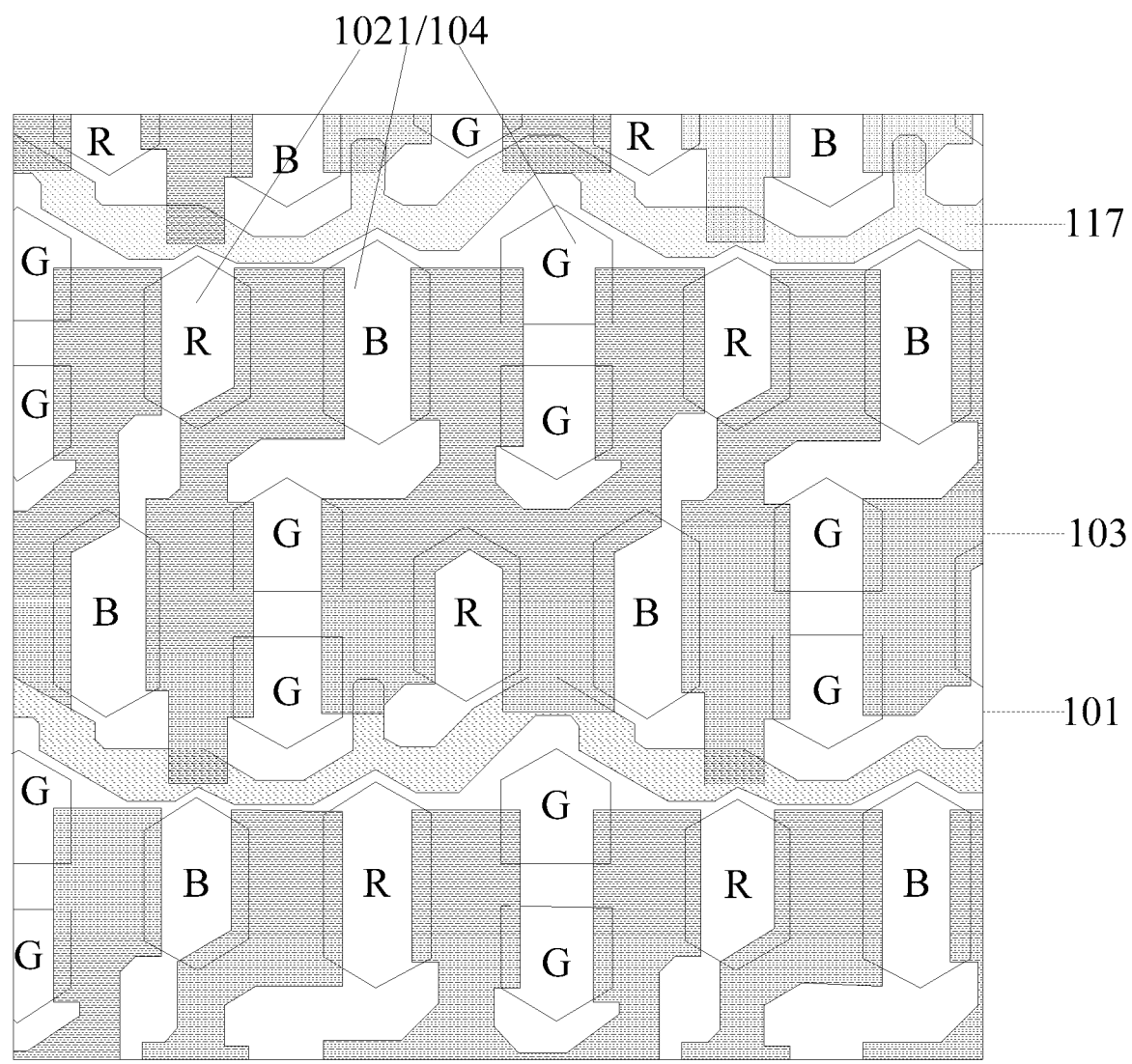
FIG. 5 is another structural schematic diagram of a display panel according to an embodiment of the disclosure.

In the second implementation, the size of the anode 1021 is kept unchanged while the size of the photosensitive device 103 is increased, to realize the overlapping of the anode 1021 with the edge of the photosensitive device 103, as shown in FIG. 5.

In the third implementation, the size of the photosensitive device 103 and the size of the anode 1021 are both changed, to realize the overlapping of the anode 1021 with the edge of the photosensitive device 103.

Since the first two implementations only need to change the size of one of the photosensitive device 103 or the anode 1021 and only need to change the mask for fabricating the photosensitive device 103 or the anode 1021 accordingly, the cost is lower.

In an implementation, after the overlapping of the light shielding portion 104 with the edge of the photosensitive device 103 is formed by any one of the above implementations, the obtained display panel may be as shown in FIG. 2, including: a pixel defining layer 105 located between the layer where the anode 1021 is located and the layer where the transparent electrode 1032 is located and having a plurality of pixel openings.

The orthographic projection of the anode 1021 on the base substrate 101 completely covers the orthographic projections of the pixel openings. Overlapping regions of the orthographic projection of the anode 1021 on the base substrate 101 with the edge regions of the orthographic projections of the photosensitive devices 103 are located within the orthographic projection of the pixel defining layer 105 on the base substrate.

Furthermore, after the overlapping of the light shielding portion 104 with the edges of the photosensitive devices 103 is formed by the above second implementation, the obtained display panel may also be as shown in FIG. 3, including: a pixel defining layer 105 between the layer where the anode 1021 is located and the layer where the transparent electrode 1032 is located and having a plurality of pixel openings.

The orthographic projection of the anode 1021 on the base substrate 101 completely covers the orthographic projections of the pixel openings. Partial overlapping regions of the orthographic projection of the anode 1021 on the base substrate 101 with the edge regions of the orthographic projections of the photosensitive devices 103 are located within the orthographic projections of the pixel openings.

In the process of fingerprint identification, in addition to the light emitted by the light emitting devices 103 that can be sensed by the photosensitive devices 103, the photosensitive devices 103 may also sense the ambient light incident through the finger. The ambient light may interfere with the fingerprint identification of the photosensitive devices 103. For example, when the ambient light shines directly above the finger, the ambient light may penetrate the finger and excite the biological tissue in the finger to emit the pigment light, which may interfere with the fingerprint identification. Through detection, the pigment light mainly includes light with wavelengths above 600 nm. Thus, in some embodiments, the pixel defining layer 105 may be configured to filter the light with wavelengths greater than 600 nm, e.g., the light with wavelengths of 600 nm to 900 nm. For example, the material of the pixel defining layer 105 includes organic resin material doped with colored dyes, so that the pixel defining layer 105 has a certain filtering effect on the light with wavelengths of 600 nm to 900 nm. The colored dyes may include Bromamine acid derivatives and the like. Therefore, through the cooperation of the light shielding portion 104 and the pixel defining layer 105, the influence of the ambient light and the photosensitive devices 103 may be improved while ensuring that the signal light passes through, increasing the accuracy of pattern identification.

Figure 6:
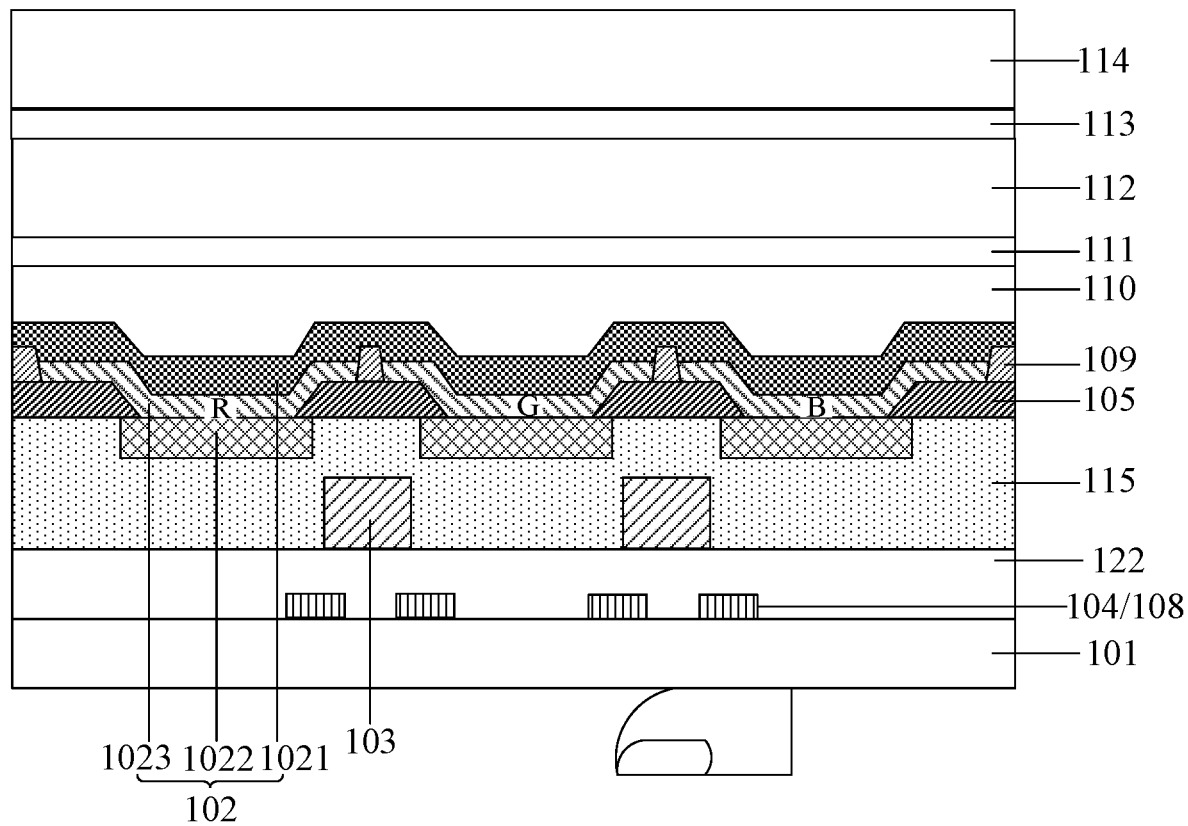
FIG. 6 is another structural schematic diagram of a display panel according to an embodiment of the disclosure.
Figure 7:
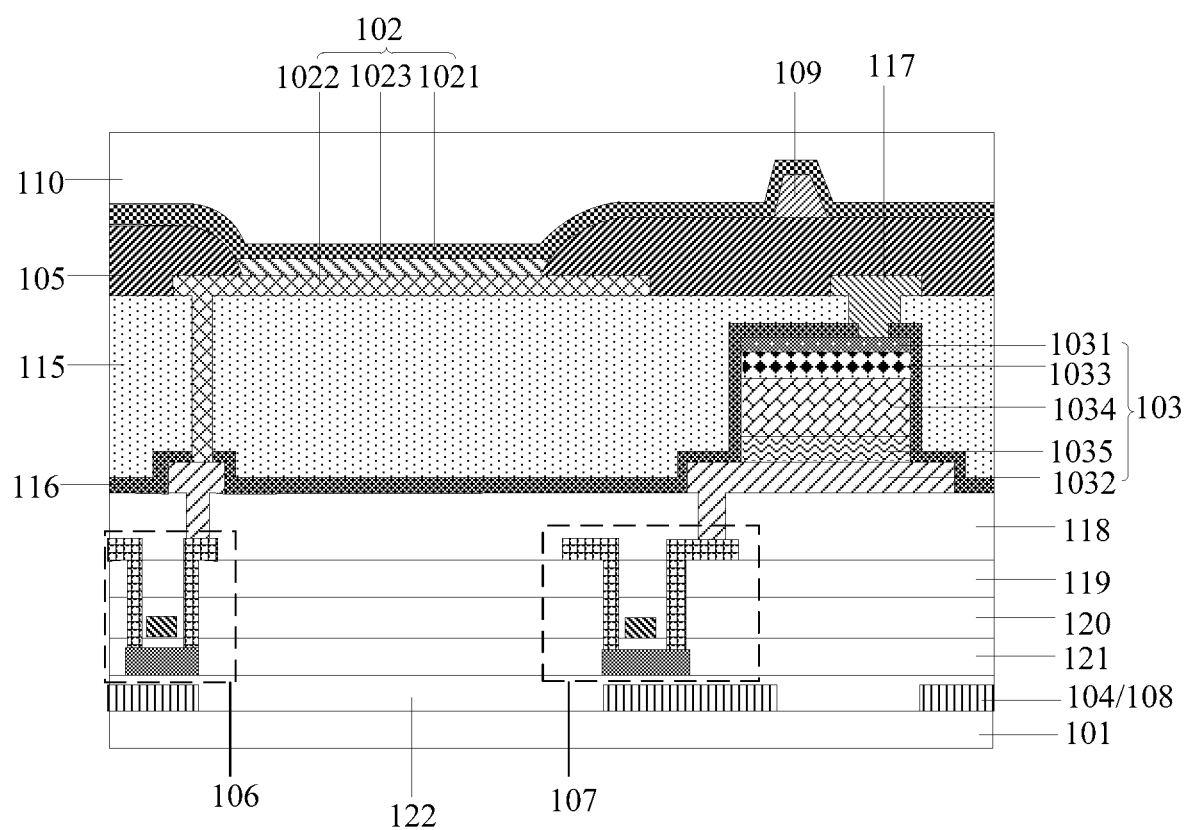
FIG. 7 is another structural schematic diagram of a display panel according to an embodiment of the disclosure.
Figure 8:
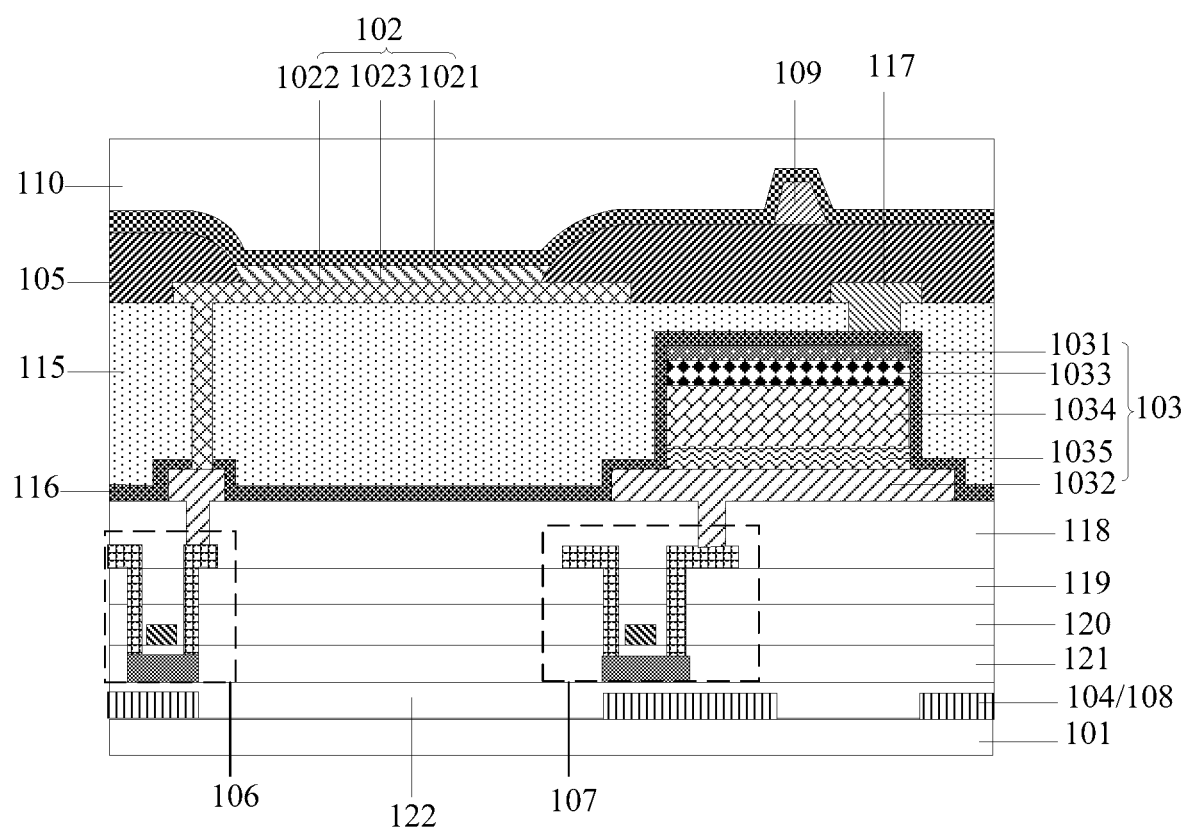
FIG. 8 is another structural schematic diagram of a display panel according to an embodiment of the disclosure.

Optionally, in the above-mentioned display panel provided by the embodiments of the disclosure, as shown in FIG. 6 to FIG. 8, the light emitting device 102 is a light emitting device 102 of bottom emission type, including: an anode 1021, a cathode 1022 on a side of the anode 1021 facing the base substrate 101, and a light emitting function layer 1023 between the anode 1021 and the cathode 1022.

The photosensitive device 103 includes: a metal electrode 1031 and a transparent electrode 1032 opposite to each other, and a photoelectric conversion layer between the transparent electrode 1032 and the metal electrode 1031. The metal electrode 1031 is between a layer where the transparent electrode 1032 is located and a layer where the cathode 1022 is located. For example, the photoelectric conversion layer is composed of a P-type semiconductor layer 1033, an intrinsic semiconductor layer 1034 and an N-type semiconductor layer 1035 that are laminated.

The light shielding portion 104 is between the layer where the transparent electrode is located and the base substrate 101.

Since the light shielding portion 104, the photosensitive device 103 and the light emitting device 102 of bottom emission type are sequentially laminated on the base substrate 101, light emitted from the light emitting device 102 of bottom emission type may be reflected by a finger and then incident to the photosensitive device 103 through the film layer where the light shielding portion 104 is located. Further, the light shielding portion 104 reduces the incidence of the ambient light to a certain extent, thus reducing the interference of the ambient light and improving the accuracy of fingerprint identification.

Optionally, the above-mentioned display panel provided by the embodiments of the disclosure, as shown in FIG. 6 to FIG. 8, further includes: a plurality of top-gate-type transistors (which may include a first transistor 106 electrically connected to the light emitting device 102, and a second transistor 107 electrically connected to the photosensitive device 103) between the base substrate 101 and the layer where the transparent electrode 1032 is located, and a light shielding metal layer 108 between a layer where the plurality of top-gate-type transistors are located and the base substrate 101. The light shielding metal layer 108 is multiplexed as the light shielding portion 104.

The light shielding metal layer 108 in the related art is multiplexed as the light shielding portion 104, avoiding the need to manufacture the light shielding portion 104 separately through a mask process, thereby simplifying the manufacturing process, saving the mask cost, and realizing the light and thin design.

Optionally, in the above-mentioned display panel provided by the embodiments of the disclosure, in the case where the light shielding metal layer 108 is multiplexed as the light shielding portion 104, the occlusion effect of the light shielding portion 104 on the edge region of the photosensitive device 103 may be realized by three following possible implementations.

In the first implementation, the size of the photosensitive device 103 is kept unchanged while the size of the light shielding metal layer 108 is increased, to realize the overlapping of the light shielding metal layer 108 with the edge of the photosensitive device 103, as shown in FIG. 7.

In the second implementation, the size of the light shielding metal layer 108 is kept unchanged while the size of the photosensitive device 103 is increased, to realize the overlapping of the light shielding metal layer 108 with the edge of the photosensitive device 103, as shown in FIG. 8.

In the third implementation, the size of the photosensitive device 103 and the size of the light shielding metal layer are both changed, to realize the overlapping of the light shielding metal layer with the edge of the photosensitive device 103.

Since the first two implementations only need to change the size of one of the photosensitive device 103 or the light shielding metal layer and only need to change the mask for fabricating the photosensitive device 103 or the light shielding metal layer accordingly, the cost is lower.

In an implementation, after the overlapping of the light shielding portion 104 with the edges of the photosensitive devices 103 is formed by any one of the above implementations, the obtained orthographic projection of the light shielding metal layer 108 on the base substrate 101 may coincide completely with the orthographic projection of the active layer and the edge regions of the orthographic projections of the photosensitive devices 103, as shown in FIGS. 7 and 8. In other words, the integrated pattern of the light shielding metal layer 108 shields the active layer and the edge regions of the photosensitive devices 103, and is provided with first openings in the middle regions of the photosensitive devices 103 and second openings in the regions where the light emitting devices 102 are located.

Figure 9:
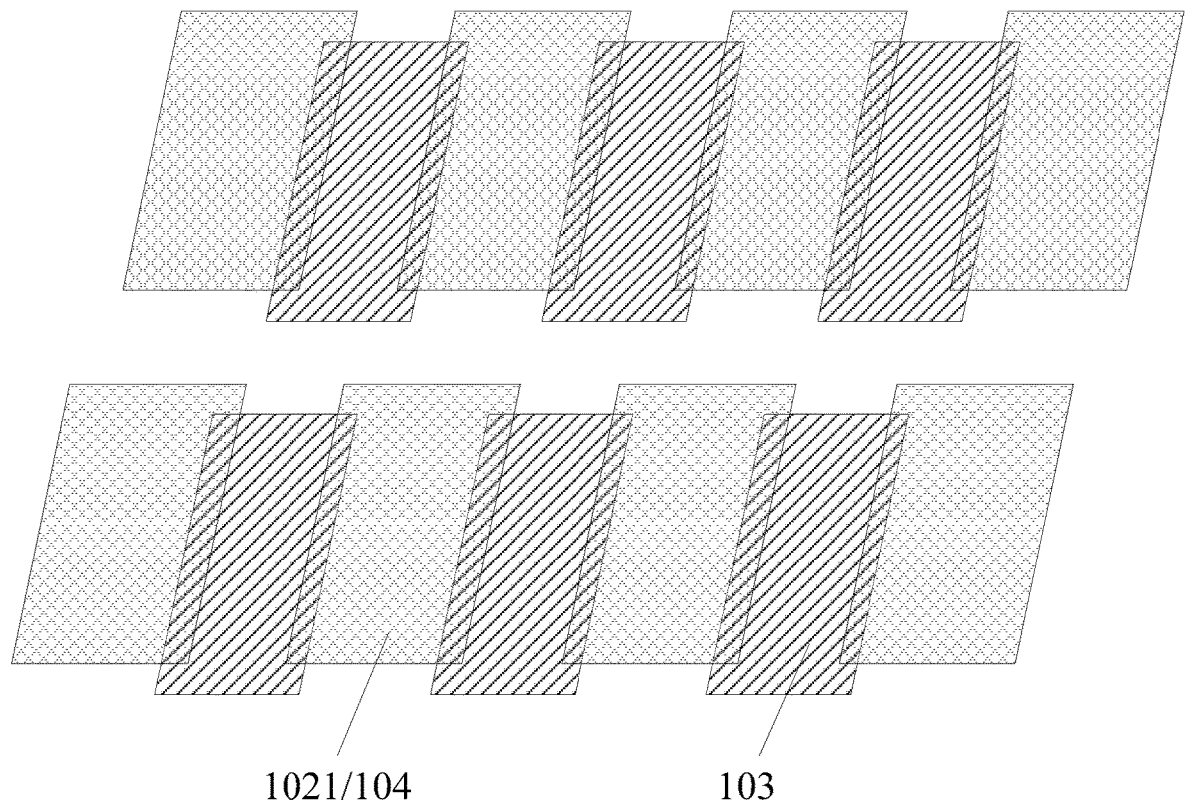
FIG. 9 is a schematic diagram of a projection relationship between the light shielding portion and the photosensitive devices in the display panel according to an embodiment of the disclosure.
Figure 10:
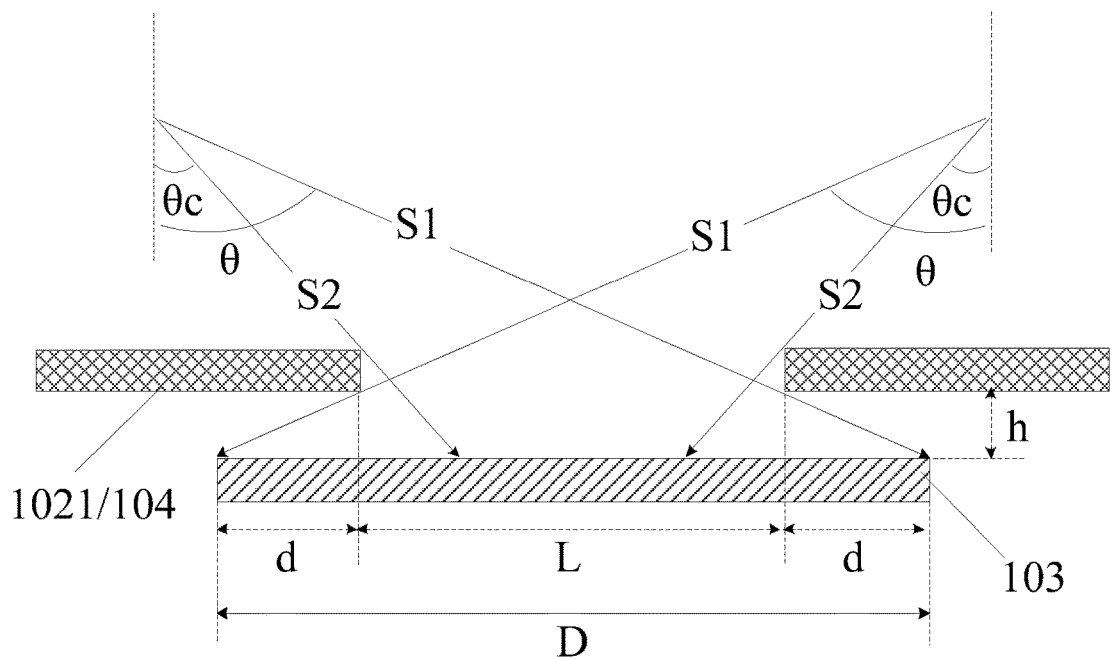
FIG. 10 is a principle diagram of a display panel according to an embodiment of the disclosure.

Optionally, in the above-mentioned display panel provided by the embodiments of the disclosure, as shown in FIG. 9 and FIG. 10, in order to ensure the overall uniformity of the fingerprint identification effect, widths of overlapping regions between the orthographic projection of the light shielding portion 104 on the base substrate 101 with the edge regions of the orthographic projections of the plurality of photosensitive devices 103 are the same.

Optionally, in the above-mentioned display panel provided by the embodiments of the disclosure, in order to enable the large-angle reflected light to be received by the photosensitive device 103 to further improve the signal-to-noise ratio, as shown in FIG. 10, the width d of the edge region of the photosensitive device 103 (i.e., the overlapping region between the photosensitive device 103 with the light shielding portion 104) may be set to satisfy a following relation:

$$d=h*\tan\theta$$

wherein h represents a distance between a layer where the light shielding portion 104 is located and a layer where the plurality of photosensitive devices 103 are located in a direction perpendicular to the base substrate 101, and θ represents a maximum reflection angle (for example, 70°) of light reflected by the fingerprint to the plurality of photosensitive devices 103.

It should be noted that the light S1 with the maximum reflection angle can just be incident on the outer boundary of the overlapping region of the light shielding portion 104 and the photosensitive device 103 under the condition of d=h*tan θ, as shown in FIG. 10. In an implementation, d may also be greater than h*tan θ, then the light S1 with the maximum reflection angle is incident into the overlapping region of the light shielding portion 104 and the photosensitive device 103. However, for the display panel including the light emitting device 102 of bottom emission type, the photosensitive device 103 is located in the non-aperture region of the display panel. If the value of d is large, the pixel aperture ratio may be affected. Therefore, the value of d is preferably h*tan θ. Exemplarily, 2.7 μm≤d≤11 μm.

Furthermore, d should be theoretically equal to (h+h')*tan θ, wherein h' is the thickness of the light shielding portion 104. Since the thickness of the light shielding portion 104 is negligible, the value is h*tan θ.

Optionally, in the above-mentioned display panel provided by the embodiments of the disclosure, in order to enable the small-angle reflected light to be received by the photosensitive device 103 to further improve the signal-to-noise ratio, the width D of the photosensitive device 103 may be set to satisfy a following relation:

$$D \geq h*(\tan\theta + 2\tan\theta c), \text{ or } D=L+2h*\tan\theta$$

wherein h represents a distance between a layer where the light shielding portion 104 is located and a layer where the plurality of photosensitive devices 103 are located in a direction perpendicular to the base substrate 101, θ represents a maximum reflection angle (for example, 70°) of light reflected by the fingerprint to the plurality of photosensitive devices 103, θc represents a minimum reflection angle (i.e., critical angle of total reflection, e.g., 42°) of light reflected by the fingerprint to the plurality of photosensitive devices 103, and L represents a width of the first opening. Exemplarily, 18 μm≤D≤40 μm.

It should be noted that, as shown in FIG. 10, under the condition of D≥h*(tan θ+2 tan θc), the light S2 with the minimum reflection angle and the light S1 with the maximum reflection angle can both be incident on the region between the overlapping regions of the light shielding portion 104 and the photosensitive device 103 (i.e., the middle region of the photosensitive device), and the ambient light directly above the overlapping regions of the light shielding portion 104 and the photosensitive device 103 as well as the ambient light with the incident angle less than the minimum reflection angle are blocked by the light shielding portion 104 and cannot be incident on the photosensitive device 103. Therefore, not only can all the signal light S be effectively incident on the photosensitive device 103, but also the crosstalk of the ambient light incident directly above the overlapping regions of the light shielding portion 104 and the photosensitive device 103 as well as the ambient light with the incident angle less than the minimum reflection angle is avoided, thereby maximizing the signal-to-noise ratio.

Furthermore, in the case where the size of the light shielding portion 104 is kept unchanged and the size of the photosensitive device 103 is changed to realize the overlapping of the light shielding portion 104 with the edges of the photosensitive device 103, the distance L between the light shielding portions 104 is kept unchanged while the width d of the overlapping region is h*tan θ, so the transverse dimension of the photosensitive device 103 is D=L+2h*tan θ. L may be greater than, equal to or less than 2h*tan θc. Exemplarily, 13.6 μm≤L≤34.6 μm.

Optionally, in the above-mentioned display panel provided by the embodiments of the disclosure, h may be greater than or equal to 1 μm and less than or equal to 4 μm according to the design capability value of the thickness in the process.

Generally, the display panel provided by the embodiments of the disclosure, as shown in FIG. 1 to FIG. 3 and FIG. 8 to FIG. 10, may further include: a spacer layer 109, an encapsulation layer 110, a first optical adhesive layer 111, a touch electrode layer 112, a second optical adhesive layer 113, a protective cover plate 114, a first planar layer 115, a sidewall protection layer 116, a bias line 117, a second planar layer 118, a first dielectric layer 119, a second dielectric layer 120, a gate insulating layer 121 and a third planar layer 122.

Moreover, embodiments of the disclosure further provide three embodiments, one of which describes a display panel in the related art as a comparative example, and the other two describe the display panel provided in the disclosure, marked as the first embodiment and the second embodiment, respectively. For example, the anode is multiplexed as the light shielding portion. In the comparative example, the anode and the photosensitive device do not overlap with each other, and the lateral width D of the photosensitive device is 18 μm, and the distance L between adjacent anodes is 18 μm. In the first embodiment, the lateral width D of the photosensitive device remains unchanged at 18 μm, and the lateral width of the anode expands outward, so that the width d of the overlapping region of the anode and the photosensitive device is 3 μm, and the distance L between adjacent anodes is 12 μm. In the second embodiment, the distance L between adjacent anodes remains unchanged at 18 μm (that is, the lateral width of the anode remains unchanged), and the lateral width of the photosensitive device expands outward, so that the width d of the overlapping region of the anode and the photosensitive device is 3 μm, and the lateral width D of the photosensitive device is 24 μm. The simulation results show that the signal-to-noise ratio of the comparative example is 12, the signal-to-noise ratio of the first embodiment is 48, and the signal-to-noise ratio of the second embodiment is 28. It can be seen that the disclosure improves the signal-to-noise ratio by blocking a part of the ambient light. It should be understood that, when the overlapping region of the anode and the photosensitive device is the same, the signal-to-noise ratio of the first embodiment is different from that of the second embodiment, mainly due to the difference in the light receiving region of the photosensitive device.

Based on the same inventive concept, embodiments of the disclosure further provide a display apparatus, including the above-mentioned display panel provided by the embodiments of the disclosure. The display apparatus may be: a mobile phone, a tablet computer, a television, a display, a notebook computer, a digital photo frame, a navigator, a smart watch, a fitness wristband, a personal digital assistant, or any other product or component with display function. All of other indispensable components of the display apparatus should be understood by those ordinary skilled in the art to be included, and will be omitted here and should not be considered as limitations on the disclosure. In addition, since the principle of the display apparatus to solve the problem is similar to the principle of the above-mentioned display panel to solve the problem, the implementations of the display apparatus can refer to the embodiments of the above-mentioned display panel, and the repeated description thereof will be omitted.

The display panel and the display apparatus provided in the embodiments of the disclosure include: a base substrate: a plurality of light emitting devices on the base substrate: a plurality of photosensitive devices between a layer where the plurality of light emitting devices are located and the base substrate: wherein the plurality of photosensitive devices are configured to collect light emitted by the plurality of light emitting devices and reflected by a fingerprint: and orthographic projections of the photosensitive devices on the base substrate are in gaps between orthographic projections of the light emitting devices on the base substrate; and a light shielding portion on a light-incident side of the plurality of photosensitive devices, wherein an orthographic projection of the light shielding portion on the base substrate overlaps with edge regions of the orthographic projections of the photosensitive devices; and the light shielding portion has first openings, and orthographic projections of the first openings on the base substrate overlap with middle regions of the orthographic projections of the photosensitive devices. The light emitting devices are used as the point light sources of the photosensitive devices, and the light with the irritation angle of 42° to 70° belongs to the signal light in the fingerprint identification process. By setting the light shielding portion that shields the edge regions of the photosensitive devices, the ambient light incident perpendicularly on the photosensitive surfaces of the photosensitive devices is effectively shielded, so that most of the light received by the photosensitive devices is signal light, to effectively avoids the influence of the ambient light on the signal light and improve the optical signal-to-noise ratio.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A display panel, comprising:

a base substrate;

a plurality of light emitting devices on the base substrate;

a plurality of photosensitive devices between a layer where the plurality of light emitting devices are located and the base substrate; wherein the plurality of photosensitive devices are configured to collect light emitted by the plurality of light emitting devices and reflected by a fingerprint; and orthographic projections of the photosensitive devices on the base substrate are located in gaps between orthographic projections of the light emitting devices on the base substrate;

a light shielding portion on a light-incident side of the plurality of photosensitive devices; wherein an orthographic projection of the light shielding portion on the base substrate overlaps with edge regions of the orthographic projections of the photosensitive devices; and the light shielding portion is provided with first openings, and orthographic projections of the first openings on the base substrate overlap with middle regions of the orthographic projections of the photosensitive devices;

wherein a width d of an edge region of the photosensitive device satisfies a following relation:

$$d = h \ast \tan \theta$$

wherein h represents a distance between a layer where the light shielding portion is located and a layer where the plurality of photosensitive devices are located in a direction perpendicular to the base substrate, and θ represents a maximum reflection angle of light reflected by the fingerprint to the plurality of photosensitive devices.

2. The display panel of claim 1, wherein:
the light emitting device is a light emitting device of top emission type, comprising:
an anode,
a cathode on a side of the anode away from the base substrate, and
a light emitting function layer between the anode and the cathode;
the photosensitive device comprises:
a metal electrode and a transparent electrode opposite to each other, and
a photoelectric conversion layer between the metal electrode and the transparent electrode;
wherein the transparent electrode is between a layer where the metal electrode is located and a layer where the anode is located; and
the light shielding portion is between a layer where the transparent electrode is located and the light emitting function layer.

3. The display panel of claim 2, wherein the anode is reused as the light shielding portion.

4. The display panel of claim 3, further comprising:
a pixel defining layer, located between the layer where the anode is located and the layer where the transparent electrode is located and being provided with a plurality of pixel openings;
wherein an orthographic projection of the anode on the base substrate completely covers orthographic projections of the pixel openings, and overlapping regions of the orthographic projection of the anode on the base substrate with the edge regions of the orthographic projections of the photosensitive devices are within an orthographic projection of the pixel defining layer on the base substrate.

5. The display panel of claim 3, further comprising:
a pixel defining layer, located between the layer where the anode is located and the layer where the transparent electrode is located and being provided with a plurality of pixel openings;
wherein an orthographic projection of the anode on the base substrate completely covers orthographic projections of the pixel openings, and partial overlapping regions of the orthographic projection of the anode on the base substrate with the edge regions of the orthographic projections of the photosensitive devices are within the orthographic projections of the pixel openings.

6. The display panel of claim 1, wherein:
the light emitting device is a light emitting device of bottom emission type, comprising:
an anode,
a cathode on a side of the anode facing the base substrate, and
a light emitting function layer between the anode and the cathode;
the photosensitive device comprises:
a metal electrode and a transparent electrode opposite to each other, and
a photoelectric conversion layer between the transparent electrode and the metal electrode;
wherein the metal electrode is between a layer where the transparent electrode is located and a layer where the cathode is located; and
the light shielding portion is between the layer where the transparent electrode is located and the base substrate.

7. The display panel of claim 6, further comprising:
a plurality of top-gate-type transistors between the base substrate and the layer where the transparent electrode is located; and
a light shielding metal layer between a layer where the plurality of top-gate-type transistors are located and the base substrate;
wherein the light shielding metal layer is reused as the light shielding portion.

8. The display panel of claim 7, wherein an orthographic projection of the light shielding metal layer on the base substrate coincides completely with an orthographic projection of active layers of the plurality of top-gate-type transistors and the edge regions of the orthographic projections of the photosensitive devices.

9. The display panel of claim 1, wherein widths of overlapping regions of the orthographic projection of the light shielding portion on the base substrate with the edge regions of the orthographic projections of the plurality of photosensitive devices are same.

10. The display panel of claim 1, wherein a width D of the photosensitive device satisfies a following relation:

$$D \geq h^*(\tan \theta + 2 \tan \theta c), \text{ or } D = L + h^* \tan \theta$$

wherein $\theta c$ represents a minimum reflection angle of light reflected by the fingerprint to the plurality of photosensitive devices, and L represents a width of the first opening.

11. The display panel of claim 1, wherein h is greater than or equal to 1 μm and less than or equal to 4 μm.

12. A display apparatus, comprising the display panel according to claim 1.

13. A display panel, comprising:
a base substrate;
a plurality of light emitting devices on the base substrate;
a plurality of photosensitive devices between a layer where the plurality of light emitting devices are located and the base substrate; wherein the plurality of photosensitive devices are configured to collect light emitted by the plurality of light emitting devices and reflected by a fingerprint; and orthographic projections of the photosensitive devices on the base substrate are located in gaps between orthographic projections of the light emitting devices on the base substrate;
a light shielding portion on a light-incident side of the plurality of photosensitive devices; wherein an orthographic projection of the light shielding portion on the base substrate overlaps with edge regions of the orthographic projections of the photosensitive devices; and the light shielding portion is provided with first openings, and orthographic projections of the first openings on the base substrate overlap with middle regions of the orthographic projections of the photosensitive devices;
wherein the light emitting device is a light emitting device of bottom emission type, comprising:
an anode,
a cathode on a side of the anode facing the base substrate, and
a light emitting function layer between the anode and the cathode;
the photosensitive device comprises:
a metal electrode and a transparent electrode opposite to each other, and
a photoelectric conversion layer between the transparent electrode and the metal electrode;
wherein the metal electrode is between a layer where the transparent electrode is located and a layer where the cathode is located; and the light shielding portion is between the layer where the transparent electrode is located and the base substrate.

14. The display panel of claim 13, further comprising:
a plurality of top-gate-type transistors between the base substrate and the layer where the transparent electrode is located; and
a light shielding metal layer between a layer where the plurality of top-gate-type transistors are located and the base substrate;
wherein the light shielding metal layer is reused as the light shielding portion.

15. The display panel of claim 14, wherein an orthographic projection of the light shielding metal layer on the base substrate coincides completely with an orthographic projection of active layers of the plurality of top-gate-type transistors and the edge regions of the orthographic projections of the photosensitive devices.

16. The display panel of claim 13, wherein widths of overlapping regions of the orthographic projection of the light shielding portion on the base substrate with the edge regions of the orthographic projections of the plurality of photosensitive devices are same.

17. A display apparatus, comprising the display panel according to claim 13.

18. A display panel, comprising:
a base substrate;
a plurality of light emitting devices on the base substrate;
a plurality of photosensitive devices between a layer where the plurality of light emitting devices are located and the base substrate; wherein the plurality of photosensitive devices are configured to collect light emitted by the plurality of light emitting devices and reflected by a fingerprint; and orthographic projections of the photosensitive devices on the base substrate are located in gaps between orthographic projections of the light emitting devices on the base substrate;
a light shielding portion on a light-incident side of the plurality of photosensitive devices; wherein an orthographic projection of the light shielding portion on the base substrate overlaps with edge regions of the orthographic projections of the photosensitive devices; and the light shielding portion is provided with first openings, and orthographic projections of the first openings on the base substrate overlap with middle regions of the orthographic projections of the photosensitive devices;
wherein the light emitting device is a light emitting device of top emission type, comprising:
an anode,
a cathode on a side of the anode away from the base substrate, and
a light emitting function layer between the anode and the cathode;
the photosensitive device comprises:
a metal electrode and a transparent electrode opposite to each other, and
a photoelectric conversion layer between the metal electrode and the transparent electrode;
wherein the transparent electrode is between a layer where the metal electrode is located and a layer where the anode is located;
the light shielding portion is between a layer where the transparent electrode is located and the light emitting function layer;
the anode is reused as the light shielding portion; and
wherein the display panel further comprises a pixel defining layer, located between the layer where the anode is located and the layer where the transparent electrode is located and being provided with a plurality of pixel openings;
wherein an orthographic projection of the anode on the base substrate completely covers orthographic projections of the pixel openings, and overlapping regions of the orthographic projection of the anode on the base substrate with the edge regions of the orthographic projections of the photosensitive devices are within an orthographic projection of the pixel defining layer on the base substrate.

19. The display panel of claim 18, wherein widths of overlapping regions of the orthographic projection of the light shielding portion on the base substrate with the edge regions of the orthographic projections of the plurality of photosensitive devices are same.

20. A display apparatus, comprising the display panel according to claim 18.

* * * * *